US008996711B2

(12) United States Patent
van Riel

(10) Patent No.: US 8,996,711 B2
(45) Date of Patent: Mar. 31, 2015

(54) CONTROLLING WEB PAGE ADVERTISEMENT THROUGH INCENTIVES AND RESTRICTIONS

(71) Applicant: Red Hat, Inc., Raleigh, NC (US)

(72) Inventor: Henri Han van Riel, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/973,828

(22) Filed: Aug. 22, 2013

(65) Prior Publication Data

US 2013/0339161 A1 Dec. 19, 2013

Related U.S. Application Data

(63) Continuation of application No. 12/040,605, filed on Feb. 29, 2008, now Pat. No. 8,521,892.

(51) Int. Cl.
*G06F 15/16* (2006.01)
*G06Q 30/02* (2012.01)
*H04L 29/08* (2006.01)

(52) U.S. Cl.
CPC ............ *G06Q 30/0277* (2013.01); *G06Q 30/02* (2013.01); *H04L 67/02* (2013.01); *H04L 67/2804* (2013.01); *H04L 67/20* (2013.01); *H04L 67/289* (2013.01)
USPC ........................................................ 709/230

(58) Field of Classification Search
CPC ............................ G06Q 30/0277; H04L 67/02
USPC ........................................................ 709/230
See application file for complete search history.

(56) References Cited

U.S. PATENT DOCUMENTS

| 7,565,399 | B1 | 7/2009 | Goel |
| 8,521,892 | B2 | 8/2013 | van Riel |
| 2004/0267763 | A1 | 12/2004 | Aschen et al. |
| 2005/0222900 | A1 | 10/2005 | Fuloria et al. |
| 2008/0155110 | A1 | 6/2008 | Morris |
| 2008/0262929 | A1 | 10/2008 | Behr |
| 2008/0270587 | A1 | 10/2008 | Mason et al. |
| 2009/0163227 | A1 | 6/2009 | Collins |
| 2009/0222510 | A1 | 9/2009 | van Riel |
| 2010/0031136 | A1 | 2/2010 | Chen et al. |

OTHER PUBLICATIONS

USPTO; Office Action for U.S. Appl. No. 12/040,605, mailed Apr. 26, 2010.
USPTO; Office Action for U.S. Appl. No. 12/040,605, mailed Aug. 5, 2010.
USPTO; Office Action for U.S. Appl. No. 12/040,605, mailed Sep. 1, 2011.
USPTO; Office Action for U.S. Appl. No. 12/040,605, mailed Jan. 26, 2012.
USPTO; Office Action for U.S. Appl. No. 12/040,605, mailed Oct. 4, 2012.
USPTO; Notice of Allowance for U.S. Appl. No. 12/040,605, mailed Apr. 24, 2013.

*Primary Examiner* — Shripal Khajuria
(74) *Attorney, Agent, or Firm* — Lowenstein Sandler LLP

(57) ABSTRACT

A resource provider receives a request for a resource and receives an indication of an advertising format, the advertising format defining at least one of a layout or content of an advertisement, and the advertising format specified by a browser that issued the request for the resource, where the advertising format is different than a format of the resource. The resource provider generates a response to the request that is compliant with the advertising format, wherein generating the response comprises selecting a resource version from a plurality of resources versions that are each compliant with the advertising format.

20 Claims, 4 Drawing Sheets

US 8,996,711 B2

CONTROLLING WEB PAGE ADVERTISEMENT THROUGH INCENTIVES AND RESTRICTIONS

RELATED APPLICATIONS

This application is a continuation of U.S. patent application Ser. No. 12/040,605 filed Feb. 29, 2008, the entire contents of which are hereby incorporated by reference herein.

TECHNICAL FIELD

Embodiments of the present invention relate to the blocking and control of the display of advertisements received from a web server or advertising server. Specifically, the embodiments relate to a method and apparatus for providing an indicator of acceptable advertisements to a web server or advertising server to induce the provision of compliant advertisements.

BACKGROUND

Users of web browsers such as INTERNET EXPLORER by Microsoft Corporation of Redmond, Wash. or MOZILLA FIREFOX by Mozilla Corporation of Mountain View, Calif., often encounter advertisements on the web pages that they access through the browsers. These advertisements take many forms including simple text advertisements, static image advertisements, popup advertisements, animated advertisements and video advertisements. Many users find all of these advertisements or a subset of these advertisements annoying or disruptive to their enjoyment of the web pages.

Many users that are unhappy with these forms of advertisements use add-on components or 'plug-ins' to their browser applications to block the appearance of some or all of the types of advertisements. The advertisement blocking software use various techniques to detect and prevent the display of the undesired advertising. The advertisement blocking software is periodically updated to block new types and uses of advertisements.

However, many web sites are funded by the advertising that is displayed in conjunction with these web sites. In some cases, the advertisements are directly administered and displayed by the web site provider. In other cases, a third party provides the advertising for a web site through an advertising server that inserts the advertisements into the web site. The web sites and advertisers attempt to circumvent the advertisement blocking software by changing the types and methods of displaying and embedding the advertisements in the web sites. This results in a constant back and forth battle between advertisement blocking software and the advertisement and web site providers.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for a cooperative process for negotiating the display of advertisements on a web page or web site. The user configures his preferences for advertisements that are displayed through a browser or plug-in interface when accessing a web page or web site. Each hypertext transfer protocol (HTTP) request generated by the browser includes an indicator of the configured preferences. The web server and/or an advertisement server detect the indicator of advertisement preference and respond to the HTTP request by providing a compliant advertisement for a web page. The advertisement is then displayed by the browser.

Figure 1:
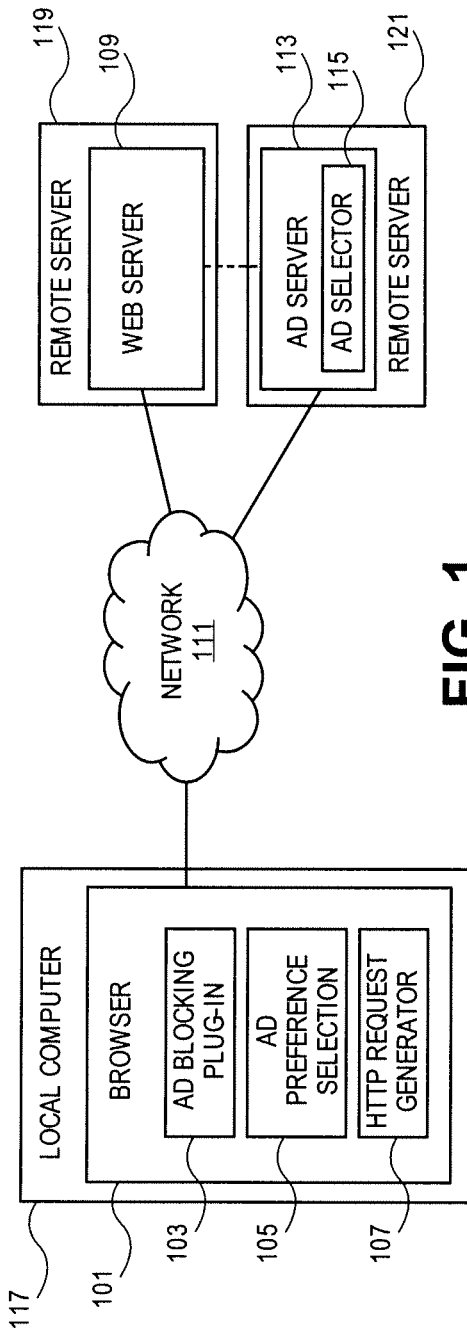
FIG. 1 is a diagram of one embodiment of a client-server system with a web browser, web server and advertisement server.

FIG. 1 is a diagram of one embodiment of a client-server system with a web browser, web server and advertisement server. The system includes a browser 101, network 111, web server 109 and optionally a separate advertisement server 113. One skilled in the art would understand that the illustrated system is a simplified system and that any the principles, structures and method described in relation to this system are applicable to analogous systems and that the system can scale to include any number of browsers 101, web servers 109 and advertisement servers 113. The network 111 connecting the components of the system can be any type of network including a local area network (LAN), wide area network (WAN), such as the Internet, or a similar network. The network 111 can include both wireless and wireline segments and components.

The browser 101 is an application executed by a computer 117 or a computer component that retrieves and displays web pages and similar resources including multimedia resources. The computer system 117 of which the browser 101 is a part can be any type of computer system including a desktop computer, laptop computer, handheld device, wireless device, console device or similar computing device. The browser may be the INTERNET EXPLORER, MOZILLA FIREFOX, OPERA browser by Opera Software of Oslo, Norway, or similar browser application. The browser 101 can include or be modified to include an advertisement blocking plug-in 103, an advertisement preference selection component 105, an HTTP request generator 107 and similar components. The advertisement blocking plug-in 103 and advertisement preference selection component 105 can be components provided by a third party, i.e., not provided by the publisher of the browser 101. The HTTP request generator 107 is a modified component of the browser 101.

The advertisement blocking plug-in 103 analyzes data received in response to HTTP requests to determine whether the data includes any unwanted advertisements or data that enables the display of advertisements that the user does not desire to see. The advertisement blocking plug-in 103 can use any method or system for detecting and blocking any unwanted advertisements that are detected in data received in response to HTTP requests. In some embodiments, the advertisement blocking plug-in 103 also monitors HTTP requests and blocks the retrieval of advertisements by blocking certain HTTP requests.

The advertisement preference selection component 105 provides an interface for a user to configure his preferences regarding the display of advertisements. The interface can be a menu, web page or toolbar in the browser 101 or similar user interface element. The advertisement preference selection component 105 can also be a separate application or an application that is part of the operating system. The advertisement preference selection component 105 can provide a set of default settings that are utilized when a user has not configured the settings. The configuration of advertisement preferences can be tied to all HTTP requests or can be tied to particular web sites or advertisement servers or similarly limited to particular targets. Example settings that can be provided and selected in any combination include settings to block text advertisements, pop-up advertisements, static image advertisements, video advertisements, animated advertisements or similar advertisements. In one embodiment, the settings indicate acceptable advertisement content such as child friendly advertisements, demographic relevant advertisements or similar settings or restrictions.

The HTTP request generator 107 is a part of the browser 101 that formulates the HTTP request to be sent to a web server 109 or advertisement server 113. The HTTP requests formulated by the HTTP request generator 107 include a request or command line such as "GET/images/picture.jpg HTTP/1.1." The HTTP requests also include a set of headers. There is a large set of headers that an HTTP request can include such as the Accept Language or Accept Encoding headers that define the types of languages and encoding that a browser will accept in response to the HTTP request. Not all web servers recognize these headers. Unrecognized headers are ignored by the web servers. The HTTP request generator 107 is modified to include an Accept Advertising or similar head in each HTTP request that defines the types of advertisements that the browser 101 will accept in response to the HTTP request.

The web server 109 receives and processes HTTP requests from the browser 101. In one embodiment, the web server 109 directly provides any advertisements for the web pages or similar resources that it provides. The HTTP request can be for a web page, which is an HTML document or for other related resources, such as images or multi-media that are embedded in the web pages. Generally, each web page and each resource associated with the web page are requested separately via an HTTP request.

The web server 109 parses each HTTP request to determine the requested resource and determine the parameters of an acceptable response indicated by the HTTP request headers. The parameters of the acceptable response include the types of advertisements accepted by the browser. The browser then retrieves or generates a response to the HTTP request that provides the requested resource within the specified parameters including if possible providing advertisements that are compliant with the advertisement preferences indicator.

In some cases, the web server 109 may have access to multiple versions of the requested resource such that different request parameters can be met. For example, a web server 109 can have copies of a web page in different languages. Similarly, the web server 109 can have copies of a web page with different formats or layouts to accommodate different types of advertisements. The processes of handling HTTP requests and selecting the advertisement are discussed further herein below in regard to FIGS. 4 and 5.

The web server 109 can be hosted on a server 119 or similar computer. The server 119 can be a dedicated server, desktop, network appliance or similar computing device. The server 119 is remote from the computer 117 hosting the browser. The server 119 can be connected to any number of separate or interconnected networks 111. The web server 109 can also be hosted by a set of server machines 119 to handle high load levels.

In some embodiments, the provision of advertisements is handled by a separate advertisement server 113. The advertisement server 113 can receive HTTP requests that are forwarded by the web server 109 or can receive HTTP requests directly from the browser 101. The advertisement server 113 processes the HTTP requests and provides the requested resource to the web server 109 or browser 101. The advertisement server 113 can select advertisements based on any algorithm or system for determining which of a set of available advertisements is to be displayed. Algorithms and systems for advertisement selection can be based on bidding systems, specific advertising space purchases or similar algorithms or systems The advertisement server 113 includes an advertisement selector component 115 that analyzes the HTTP header to determine whether an advertisement preference has been provided. If the advertisement preference header is found then the advertisement selector component 115 attempts to select and provide a compliant advertisement. The process of selecting an advertisement is discussed in greater detail below in regard to FIG. 5.

The advertisement server 113 can be hosted by a dedicated server machine 121, a shared server machine or similar computing device. The server machine can also be a desktop computer, network appliance or similar computing device. In one embodiment, the advertisement server 113 can be hosted by the same server machine as the web server 109. The advertisement server 113 can also be hosted by a set of server machines to handle high load levels.

Figure 2:
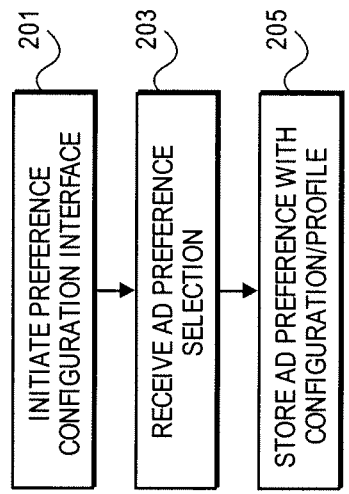
FIG. 2 is a flowchart of one embodiment of a process for configuring advertisement preferences.

FIG. 2 is a flowchart of one embodiment of a process for configuring advertisement preferences. The process is executed by the advertisement preference selection component or similar component. The process can be initiated by the user selecting the menu, icon or similar user interface element associated with the advertisement preference selection (block 201).

In response, a menu of options can be displayed, or similar selection mechanism such as a toolbar or web page is provided. The interface can utilize any type of user interface elements such as buttons, check boxes, text fields, drop down menus or similar elements. Any combination or complexity of preferences can be defined. The user confirms the selection through a button, closing a menu or through each selection (block 203).

The preferences can be stored with other configuration data for the browser or as a separate configuration file (block 205). The configuration data can be stored in any format and in any location. The configuration data can be accessed by the browser or browser plug-ins to formulate HTTP request headers that indicate the appropriate advertisement preferences. The configuration information can be linked to particular users or user accounts allowing different users to individually configure their preferences.

Figure 3:
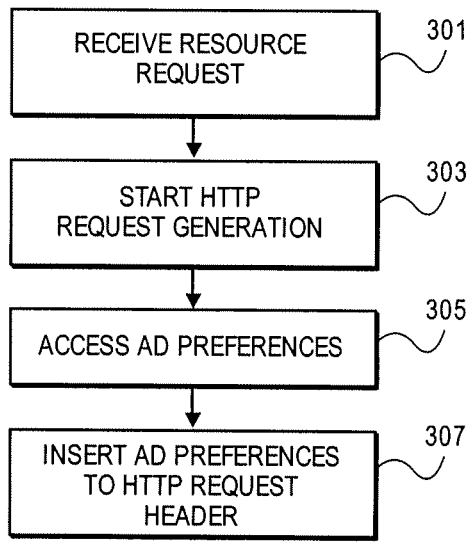
FIG. 3 is a flowchart of one embodiment of a process for generating an HTTP request.

FIG. 3 is a flowchart of one embodiment of a process for generating an HTTP request. The process can be initiated by a user action specifying a resource to be retrieved using an HTTP request (block 301). The HTTP request can be specified by the input of a uniform resource locator (URL), the selection of a hypertext markup language (HTML) link in a web page or through a similar mechanism. This process is executed by the HTTP request generator and similar components of the browser.

In response to receiving the input resource, the generation of an HTTP request is initiated (block 303). The components of the HTTP request are defined including the request line such as a GET operation, a URL or file system identifier and the HTTP request headers that define required response parameters such as acceptable languages. Some of the HTTP headers are determined by accessing stored configuration data. The stored configuration data may be loaded at the time that the browser is started or as needed during the operation of the browser. The stored configuration data includes the stored advertisement preferences, which are retrieved from the configuration data (block 305).

The retrieved advertisement preferences are analyzed to determine an encoding to place in the header to indicate the preferences of the current user of the browser (block 307). Identifying the advertisement preferences includes matching a current user with a corresponding profile. The header information encoding the advertisement preferences can have any format, size or content compatible with an HTTP request header. The format and encoding must only be standardized such that browsers, web servers and advertisement servers can consistently communicate and interpret the preferences specified in the HTTP header.

Figure 4:
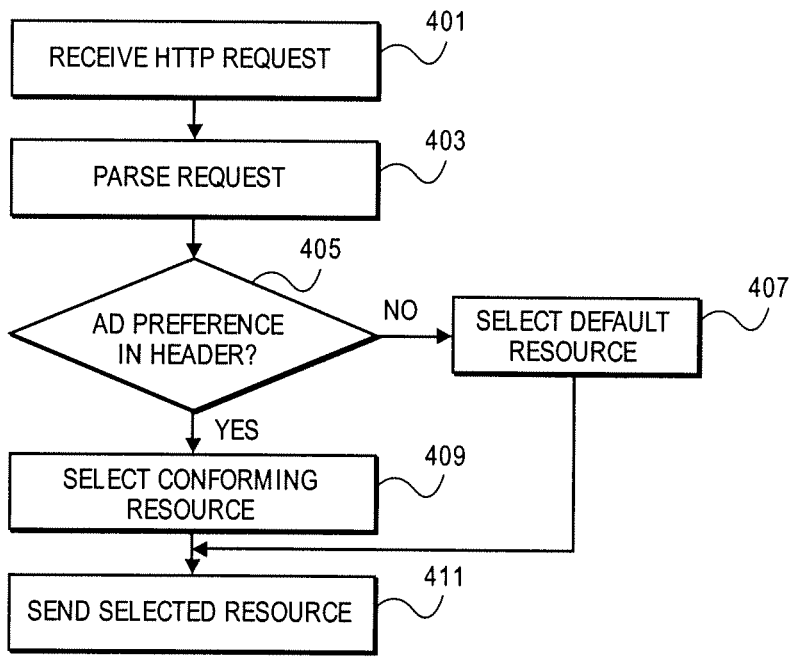
FIG. 4 is a flowchart of one embodiment of a process for handling an HTTP request.

FIG. 4 is a flowchart of one embodiment of a process for handling an HTTP request. This process is executed by a web server or advertisement server receiving the HTTP request. The process is initiated in response to receiving an HTTP request from a browser application or similar client application (block 401). The web server or advertisement server can service any number of HTTP requests. The process described herein is simplified for sake of clarity. One skilled in the art would understand that the process would also entail additional details and operations that are not germane to the handling of the HTTP request as it pertains to the advertisement preference system. Also, the process handles any number of requests concurrently by running separate instances or through mechanisms.

As each request is received, it is parsed or similarly analyzed to determine the resource that is being requested as well as the parameters that have been defined for the response (block 403). Each header in the HTTP request is checked to determine whether it is a recognized header type and its parameters are checked to determine whether there is a resource that matches the parameters or whether the resource can be provided to the browser in compliance with the requested parameters.

A check is made to determine if one of the headers is an advertisement preference header (block 405). If no advertisement preference header is found in the HTTP request then any advertisement or resource can be selected and sent in response to the request (block 407). In the case where the HTTP request is processed by a web server, a default resource can be specified. In the case where the HTTP request is processed by an advertisement server, a default advertisement or an advertisement determined based on a specific algorithm or system according to the business model of the advertisement server is selected.

If an advertisement preference header is found, then available resources including different types of advertisements are reviewed to select a compliant resource or advertisement to be sent in the response to the HTTP request (block 409). If multiple compliant resources or advertisements are found then other criteria can be applied to choose amongst the compliant resources or advertisements as discussed below in regard to FIG. 5. The reply to the HTTP request is then prepared after the selected resource and/or advertisements have been retrieved. The HTTP reply with the selected resource is then sent to the browser (block 411).

Figure 5:
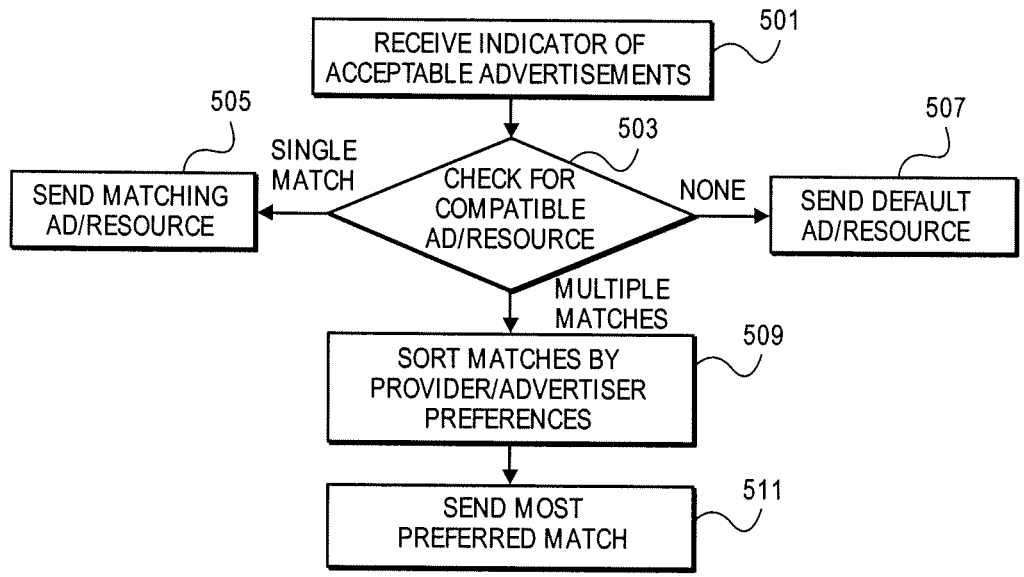
FIG. 5 is a flowchart of one embodiment of a process for matching advertisements with received advertising preferences.

FIG. 5 is a flowchart of one embodiment of process for matching advertisements with received advertising preferences. This process is executed by an advertisement selection component that can be part of an advertisement server or a web server. The process is initiated upon the detection of an advertisement preference indicator in an HTTP header and a call is made to the advertisement selector to find a compliant advertisement or resource (block 501). While the process is described with relation to finding a compliant advertisement, one skilled in the art would understand that the process is also applicable for determining associated resources. For example, if an HTTP request allows video advertisements, then a request for the web page associated with the advertisement would require the selection of a version of the web page that references the video and defines an area of the page for video playback.

The advertisement selection component receives the parameters of the advertisement preference header as an input and uses these parameters to search available advertisements and resources (block 503). The search reveals either that no resources or advertisements meet the compliance criteria, a single advertisement or resource is compliant or multiple advertisements or resources are compliant.

If no resources or advertisements are compliant, then a default advertisement or resource can be selected (block 507). The default resource or advertisement can have any format for any type of advertisement. In one embodiment, since, it is not possible to comply with the advertisement preference request any advertisement or resource can be provided in the response. The advertisement blocking software may block the resource or advertisement, so a selection where the resource or advertisement is the least disrupted or least likely to be blocked can be selected. In another embodiment, the selected resource or default can include no advertisement, a public service advertisement or other acceptable content or format to avoid blocking by the advertisement blocking software. Any selection scheme for multiple available non-compliant resources or advertisements or multiple available default resources or can be utilized. The advertiser's preferences can be incorporated or the web server manager's preferences can be incorporated into this portion of the selection process. The selected advertisement or resource is then returned to the advertisement server or web server.

If a single matching resource or advertisement is found, then that advertisement or resource is returned to the advertisement server or web server. In another embodiment, the advertisement server administrator can select to override a compliant selection to provide a non-compliant selection. However, such an override runs the risk of being blocked and that future compliant responses from the same source may be blocked due to a blacklisting for non-compliance.

If multiple resources or advertisements fulfill the parameters of the advertisement preference indicator, then the advertisement selection component can apply any set of criteria to the compliant resources and advertisements to select one to be returned in the response (block 509). The sorting or matching algorithm that is applied can rank available advertisements or resources according to a preference order specified by the web site administrator, advertisement server administrator, individual advertisers or similar entities. Generally, the algorithms attempt to maximize the preferences of these entities within the boundaries set forth for compliance by the advertisement preferences indicator. The selected advertisement or resource is then returned to the web server or advertisement server (block 511).

Figure 6:
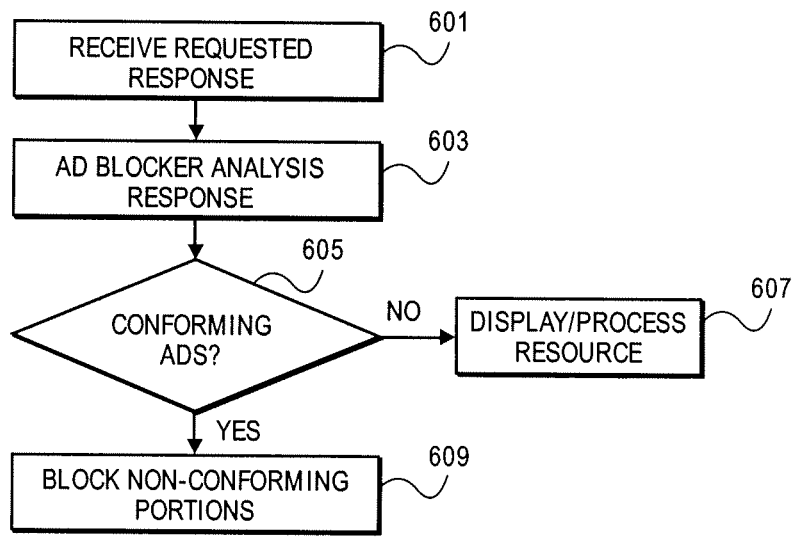
FIG. 6 is a flowchart of one embodiment of a process for displaying a response to the HTTP request.

FIG. 6 is a flowchart of one embodiment of a process for displaying a response to the HTTP request. This process is executed by a browser or similar application upon receiving a response to the HTTP request from the advertisement server and/or the web server (block 601).

The HTTP response is analyzed by any available advertisement blocker plug-in or program (block 603). The analysis of the response data can be according to standard advertisement blocking techniques and methods. A check is made by the advertisement blocking software to determine whether any advertisements that were received in the response are compliant with the advertisement preference indicator in the HTTP request header (block 605). If all of the advertisements in the response appear to conform to the advertisement preferences of the user, then the resource and/or the advertisements are displayed (block 607). However, if any of the received advertisements are determined to be non-compliant either partially or wholly, then those advertisements or resources can be blocked (block 609). Blocking can result in the blocking of a pop-up window, removal of an image, animation or video from a web page or similar modification of a received resource or advertisement set.

Figure 7:
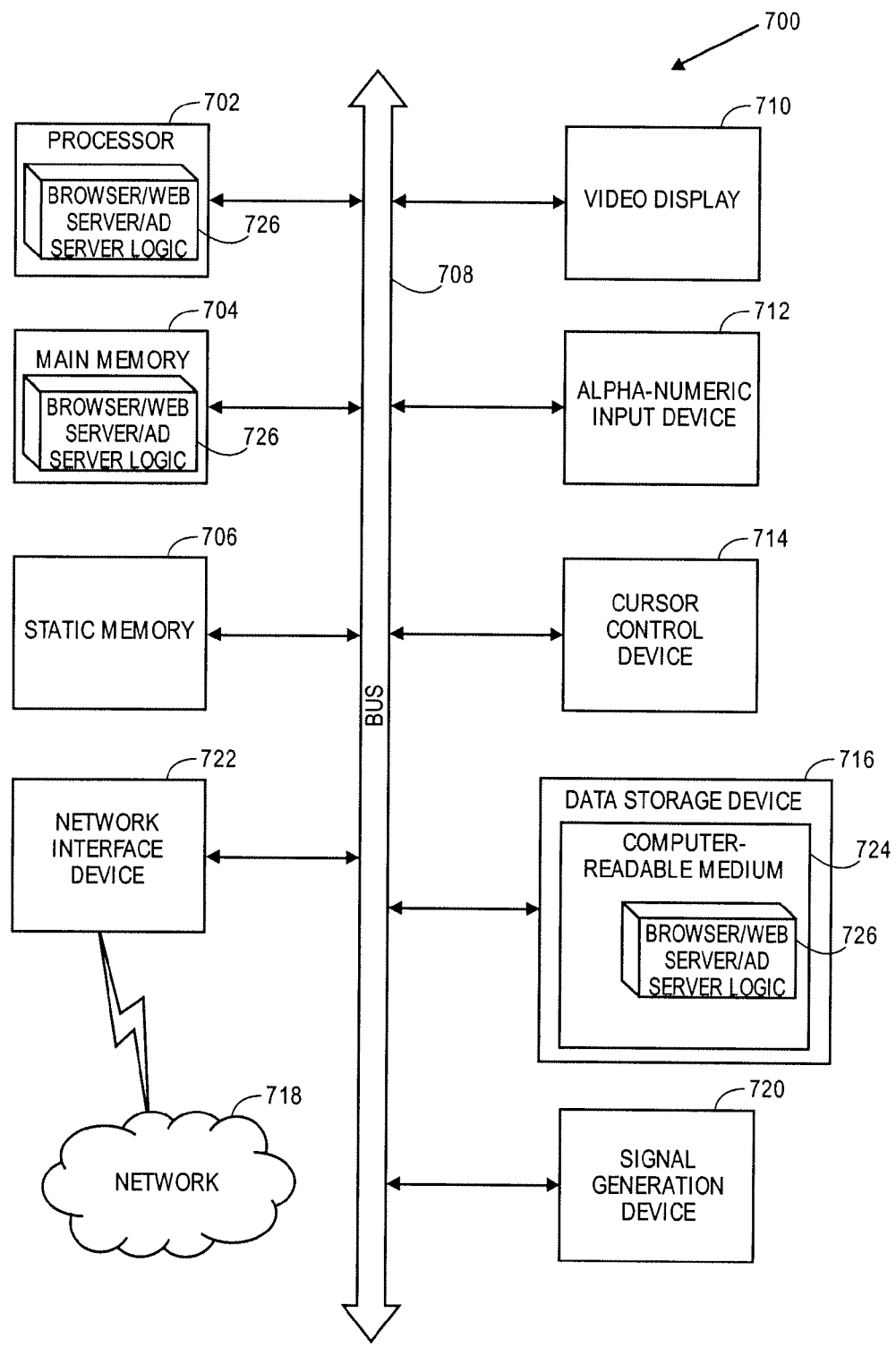
FIG. 7 is a diagram of a computer system providing the web server, ad server or browser.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., network 718) to other machines in a Local Area Network (LAN), an intranet, an extranet, or the Internet. The machine may operate in the capacity of a server or a client machine (e.g., the local computer executing the browser logic 726 implementing the advertisement preferences scheme or the remote servers executing the web server or advertisement server logic 726 implementing the advertisement preference scheme) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 716 (e.g., a data storage device including a fixed or removable computer-readable medium 724), which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the browser/web server/ad server logic 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system 700 through a graphics port or graphics chipset, an alphanumeric input device 712 (e.g., a keyboard), a cursor control device 714 (e.g., a mouse), and a signal generation device 720 (e.g., a speaker).

The secondary memory 716 may include a machine-readable storage medium (or more specifically a computer-readable storage medium 724) on which is stored one or more sets of instructions (e.g., browser/web server/ad server logic 726) embodying any one or more of the methodologies or functions described herein. The logic 726 may also reside, completely or at least partially, within the main memory 704 and/or within the processing device 702 during execution thereof by the computer system 700, the main memory 704 and the processing device 702 also constituting machine-readable storage media. The logic 726 may further be transmitted or received over a network 718 via the network interface device 722.

The machine-readable storage medium 724 may also be used to store a browser, advertisement blocker, HTTP request generator, advertisement preferences selector component, web server, advertisement server, advertisement selector component or similar software components. While the machine-readable storage medium 724 is shown in an exemplary embodiment to be a single medium, the terms "machine-readable storage medium" and "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" "computer readable-mediums" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be born in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "generating," "determining," "selecting," "displaying," "searching," "receiving," "updating," "modifying," "assigning," "requesting," "clearing," "running," "committing," "moving," "executing," "closing," "detecting," "initiating," "returning," "parsing," "inserting," "sending," "accessing," "analyzing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer readable medium includes any mechanism for storing information in a form readable by a computer. For example, a computer readable medium includes read only memory ("ROM"), random access memory ("RAM"), magnetic disk storage media; optical storage media, flash memory devices or other type of machine-accessible storage media.

Thus, a method and apparatus for managing session data through a session affinity manager and session affinity cache has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a request for a resource;
receiving an indication of an advertising format, the advertising format defining at least one of a layout or content of an advertisement, and the advertising format specified by a browser that issued the request for the resource, where the advertising format is different than a format of the resource; and
generating, by a processing device, a response to the request that is compliant with the advertising format, wherein generating the response comprises selecting a resource version from a plurality of resource versions that are each compliant with the advertising format.

2. The method of claim 1, wherein generating the response comprises:
selecting a default version of the resource in response to finding no acceptable advertising format indicator in the request.

3. The method of claim 1, wherein the request comprises a hyper-text transfer protocol (HTTP) request.

4. The method of claim 1, wherein the indication encodes at least one restriction on the advertising format, the at least one restriction comprising a child friendly restriction.

5. The method of claim 1, wherein the indication encodes at least one restriction on the advertising format including any one of a text restriction, a still image restriction, a sound restriction, an animation restriction or a video restriction.

6. The method of claim 5, wherein the indication encodes a plurality of restrictions.

7. The method of claim 1, further comprising:
sending the response to the browser that issued the request for the resource.

8. A non-transitory computer readable storage medium storing instructions which, when executed, cause a processing device to:
receive a request for a resource;
receive an indication of an advertising format, the advertising format defining at least one of a layout or content of an advertisement, and the advertising format specified by a browser that issued the request for the resource, where the advertising format is different than a format of the resource; and
generate, by a processing device, a response to the request that is compliant with the advertising format, wherein generating the response comprises selecting a resource version from a plurality of resource versions that are each compliant with the advertising format.

9. The non-transitory computer readable storage medium of claim 8, the instructions to further cause the processing device to:
select a default version of the resource in response to finding no acceptable advertising format indicator in the request.

10. The non-transitory computer readable storage medium of claim 8, wherein the request comprises a hyper-text transfer protocol (HTTP) request.

11. The non-transitory computer readable storage medium of claim 8, wherein the indication encodes at least one restriction on the advertising format, the at least one restriction comprising a child friendly restriction.

12. The non-transitory computer readable storage medium of claim 8, wherein the indication encodes at least one restriction on the advertising format including at least one of a text restriction, a still image restriction, a sound restriction, an animation restriction or a video restriction.

13. The non-transitory computer readable storage medium of claim 12, wherein the indication encodes a plurality of restrictions.

14. The non-transitory computer readable storage medium of claim 8, the instructions to further cause the processing device to send the response to the browser that issued the request for the resource.

15. A method comprising:

generating, by a processing device, a request for a resource managed by a resource provider;

inserting, into the request, an indication of an advertising format, the advertising format defining at least one of a layout or content of an advertisement, where the advertising format is different than a format of the resource; and sending the request for the resource to the resource provider, the resource having a resource version of a plurality of resource versions that are each compliant with the advertising format.

16. The method of claim 15, further comprising:

accessing local advertisement format restriction preferences.

17. The method of claim 15, further comprising:

receiving a response to the request that is compliant with the advertising format.

18. The method of claim 15, further comprising:

analyzing the response to the request to determine compliance with the advertising format.

19. The method of claim 15, wherein the request comprises a hyper-text transfer protocol (HTTP) request.

20. The method of claim 15, wherein a browser running on a client computing device generates the request for the resource.

* * * * *